Dec. 18, 1951 S. H. ROLLASON 2,578,842
ATTACHMENT FOR USE IN SERVICING
SCREW THREADING TAPS
Filed Feb. 24, 1948 2 SHEETS—SHEET 1
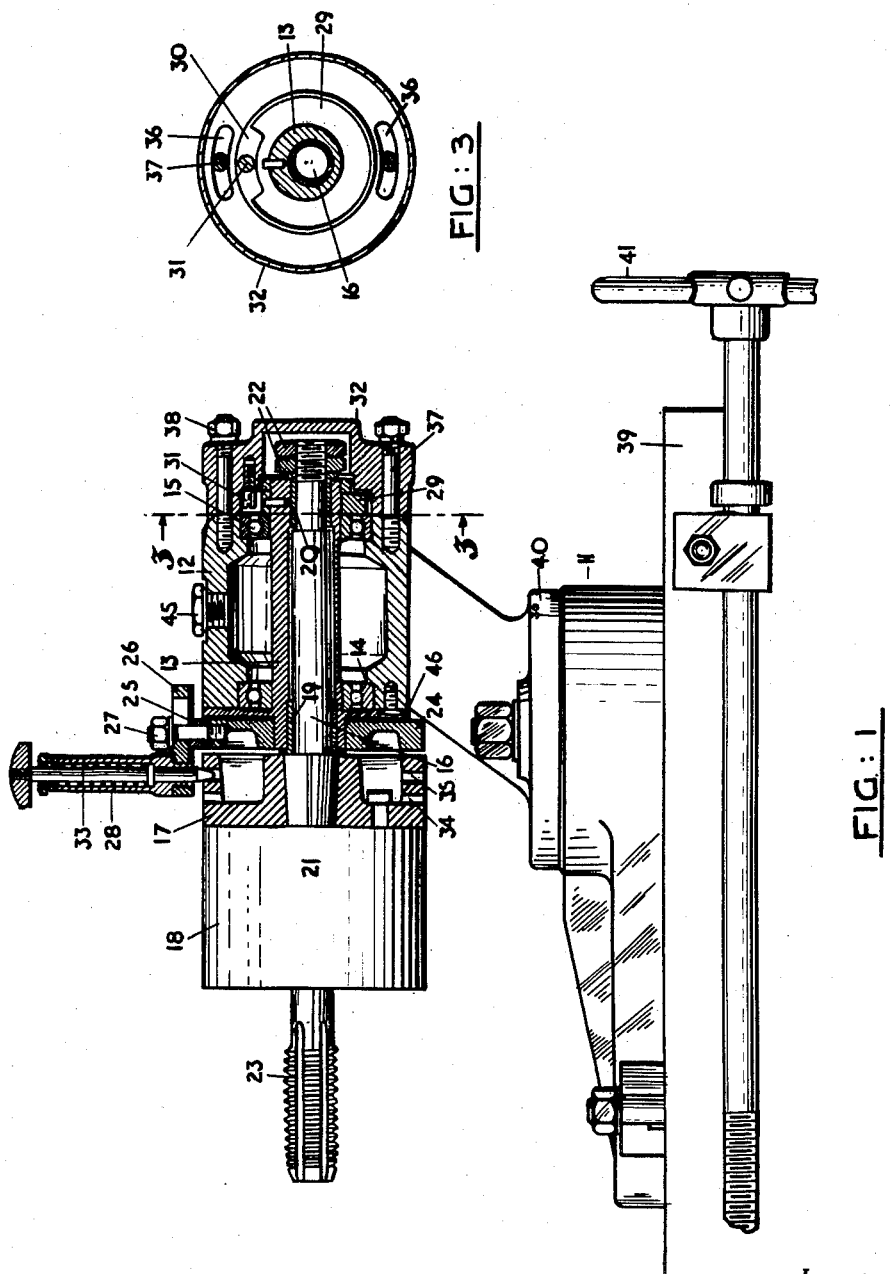
Inventor
SIDNEY H. ROLLASON
By
Attorney

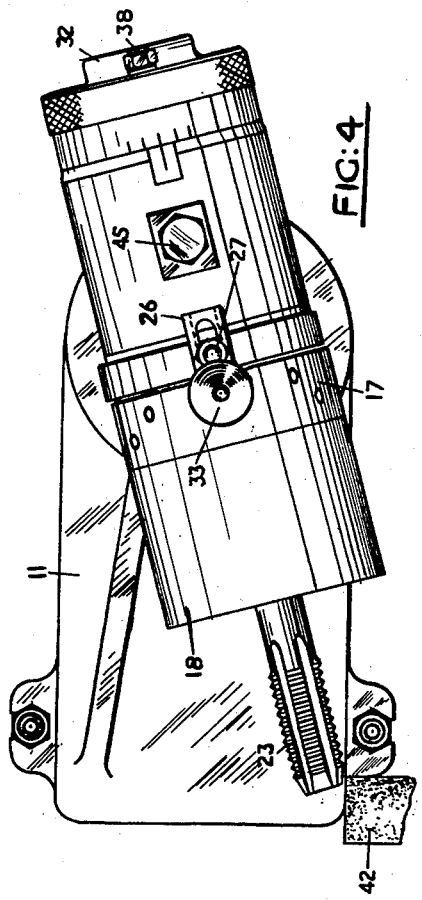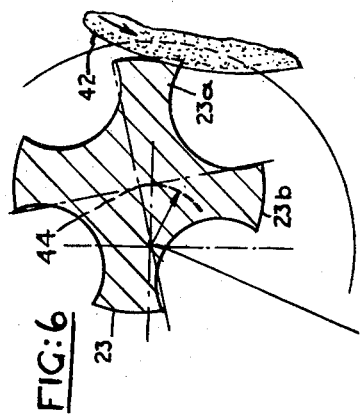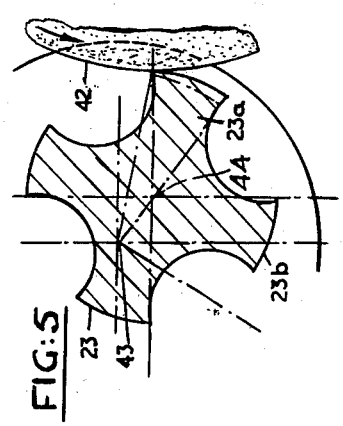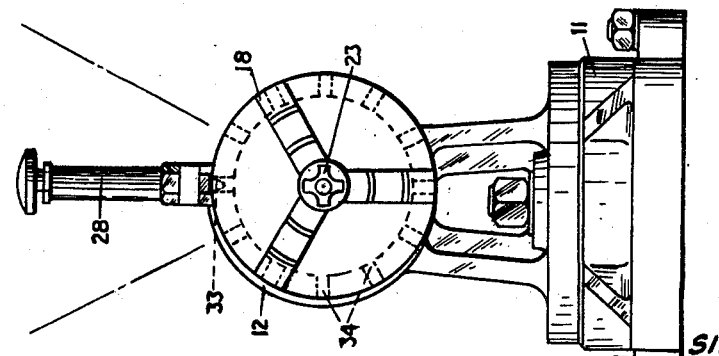

Patented Dec. 18, 1951

2,578,842

UNITED STATES PATENT OFFICE 2,578,842

ATTACHMENT FOR USE IN SERVICING SCREW-THREADING TAPS

Sidney H. Rollason, Coventry, England

Application February 24, 1948, Serial No. 10,378
In Great Britain December 5, 1944

Section 1, Public Law 690, August 8, 1946
Patent expires December 5, 1964

2 Claims. (Cl. 51—234)

My object is to provide an attachment (either for use with a surface grinding machine, or, if provided with a suitable base, for use with a cutter grinding machine) by means of which the teeth of a tap can be "relieved" when servicing becomes necessary. That is to say, when a tap has been in use for a sufficient period for wear or for damage to have occurred, the leading end of the tap can be ground back and the next teeth provided with the necessary "relief" to enable the tap again to be used.

It is a difficult matter to provide all the lands or lines of teeth between the flutes with identical "reliefs," with the result that a very high percentage of taps which have been serviced in the past have had to be rejected.

By means of my attachment, however, worn or damaged taps can be accurately serviced in a very simple manner, and a tool-setter can be taught, with very little difficulty, to use the attachment.

According to the invention, an attachment as aforesaid includes a chuck, to receive the shank of a tap (and it is assumed that the shank is truly concentric with the lines of teeth—i. e., that if it was not originally truly concentric it has been ground to be concentric), eccentrically mounted in a cylindrical member rockable about an axis which is parallel to that of the chuck and which is related to the axis of the grinding wheel when correctly positioned, means for indexing the chuck with respect to the rockable member to bring the desired lands or lines of tap teeth successively to the grinding position, means for limiting the rocking movement so that only the teeth of the indexed line will undergo the grinding operation for this particular index position of the chuck, and means for angularly setting the range of the rocking movement dependently upon the "relief" required.

The attachment can be fitted to any surface grinding machine, or, with a suitable base and provision for a fine feed, to any cutter grinding machine.

One construction of attachment, according to my invention, is illustrated by the drawings in which:

Figure 1 is a side elevation in part section;

Figure 2 is a left-hand end view of Figure 1;

Figure 3 is a section on the line 3—3 of Figure 1;

Figure 4 is a plan showing the tap presented at the lead angle; and

Figures 5 and 6 are diagrams illustrating, respectively, the commencement and finishing of the relief cut.

Referring to the drawings, the attachment includes a cast or other base plate 11 rotatably supporting (for movement about a vertical axis) a bearing housing or body 12 in which a spindle 13, referred to above as the rockable member, is journalled in spaced anti-friction bearings 14, 15. Eccentrically mounted within the spindle, is a shank 16 fast with an indexing ring 17 to which a chuck 18 is bolted.

The indexing ring is held on a coned portion of the shank by the head of an axial screw (not shown) in the latter, and the shank is received within bearing bushes 19, 20, in the spindle. The bushes 19, 20, have radial thrust portions coacting, respectively, with a step 21 at the base of the coned portion of the shank and a pair of lock nuts 22, to locate the shank axially within the spindle.

The chuck 18, which is preferably a three-jaw one operable by a scroll, is adapted to receive the shank of a tap, indicated at 23, to be serviced— and it is assumed that the shank of the tap is coaxial with the teeth of the tap. (This is the case with most taps, but sometimes the shank of a B. A. tap is not quite concentric, and in this event it should first be ground to be truly concentric.)

The spindle 13 has fast upon it a flange 24 which is slotted across its edge to receive a key block 25. The head of this block is received in a channel in the under-side of a slotted plate 26, the latter and the block being secured to the flange 24 by a stud and nut 27. The plate 26 carries an operating handle 28 by which the spindle 13 can be rocked, to a limited extent (indicated by the chain dotted lines in Figure 2) about its journal bearings in the body. For limiting this rocking movement, a ring 29, provided with a peripheral slot 30 of an appropriate length, is keyed on the spindle, and an abutment pin 31, carried by the body end cap 32, enters the slot 30 to provide a rocking movement, say, through 55°.

Extending within the handle 28 is a plunger 33 which is spring-pressed to co-operate with one or more series of indexing holes provided in the periphery of the ring 17. These holes are spaced angularly around the periphery, and marked as necessary, so as to allow for indexing for a two, three, four or other fluted tap—i. e., so that when one land or line of teeth has been ground the chuck can be indexed as necessary, dependently upon the number of flutes in the tap, to bring the next line of teeth into the grinding position. Thereupon rocking the spindle, and thereby the chuck, by means of the handle will move the line of teeth relatively to the grinding wheel whilst the teeth are being "relieved" in a predetermined manner (hereinafter described) depending upon the angular position of the spindle relatively to the grinding wheel.

To facilitate indexing, I employ, in the example shown, two circles 34, 35, of holes in the flange 17, either of which series can be engaged by the plunger 33, by sliding the plate 26 after slackening the nut 27. For example, one of the circles 34, 35, may have eight holes spaced at 45°, for a two, four or eight fluted tap, and the other six holes at 60°, for a two, three or six fluted tap.

To allow of setting, for different "reliefs," the end cap 32 may be provided with arcuate slots 36 engaged by studs 37 fast with the body and secured by nuts 38, as shown. This allows of adjusting the cap angularly with respect to the body and thereby adjusting the abutment stop, by which means the range of the rocking movement can be angularly set as necessary. Appropriate markings may be arranged, to coact with one another, between the cap and the body to indicate the selected setting.

To use the attachment, it is first secured to the work-table 39 of a grinding machine, and the tap 23 set up in the chuck. The position of the plate 26 is adjusted so as to enable the plunger 33 to coact with the appropriate circle of holes in the flange 17, and (where this adjustment is provided) the end cap 32 is turned to orientate the range of rocking movement to the desired position to give the required relief. The body 12 is turned about its vertical pivot (with respect to the base plate) until the desired lead angle (which can be read from a scale indicated at 40 in Figure 1) is obtained, and, using the handle 41, the table 39 is traversed until the tap is presented to the grinding disc. The condition thus far achieved is shown in Figure 4, where the tap is shown presented at the requisite lead angle to the grinding disc 42.

The grinding action for obtaining the relief on the teeth forming the lead of the tap is illustrated by Figures 5 and 6, where the turning axis of the spindle 13 is indicated at 43, and the axis of the chuck at 44. By rocking the handle 28 so that the tap moves from the position shown in Figure 5 to that shown in Figure 6, the tooth 23a is relieved by the removal of the portion indicated by chain lines in the latter figure, since the tap moves about the axis 43. When it is desired to relieve the next tooth, say 23b, the chuck is turned about the centre 44, by engaging the plunger 33 with the appropriate hole in the flange 17, and the tooth 23b moves into the positions in Figures 5 and 6 shown occupied by the tooth 23a.

It will be seen from Figures 5 and 6 that the relief given to the tooth depends upon the eccentric throw of the tap towards the grinding disc during the range of oscillation permitted by the pin 31 and slot 30 (see Figure 3). By setting the end cap to bring the slot 36 into another angular position the oscillation (although not altered in magnitude) takes place about another mean angular position so as to vary the eccentric throw for giving a different degree of relief.

In practice the provision of an eccentricity, as regards the axes of the chuck shank and the spindle, of approximately 90 thousandths is satisfactory to cover a range of taps of from 0.14" to 1.5". By using a larger eccentricity the "relief" may be increased, so that larger-diameter taps can be serviced.

The body 12 may have a plugged hole, indicated at 45, through which it can be filled with lubricant. In this case, leakage from the bearing 14 is prevented by a plate 46 screwed to the adjacent end of the body.

It should be understood that the present invention is concerned with an attachment as aforesaid. I am aware that complete machines have been proposed for sharpening screwing taps, in which a tap to be "relieved" is mounted to rotate about its own axis for passing from one cutting edge to another and to be moved bodily about another and parallel axis to produce "relief." An example of such a construction will be found in British patent specification No. 360,990.

In practice it is not, of course, an economical proposition to install a complete machine merely for servicing a worn tap; but the attachment of the invention, on the other hand, can be inexpensively produced for use with a standard type of surface grinding machine, or with a cutter grinding machine as long as the latter is provided with a suitable base.

Furthermore, in these prior machines, the free end of the tap is supported by a centre. This is all right in the case of a new tap which is to be "relieved"; but when a tap is "serviced" its free end is, of course, ground back and its centre hole reduced or obliterated—a matter which is immaterial with an attachment according to the invention in which the tap to be serviced is supported wholly by the chuck.

What I claim as my invention and desire to secure by Letters Patent of the United States is:

1. For providing "relief" for a screw-cutting tap having a shank and cutting teeth, an attachment, for a suitable grinding machine having a grinding wheel, including a chuck to concentrically receive the shank of the tap, a cylindrical member having an eccentric bore in which said chuck is axially located with its axis parallel to that of said cylindrical member, a body supporting said cylindrical member with axial location and for rocking movement about its axis, means for supporting said body with the axis of said chuck to be related in a desired manner to the axis of the grinding wheel, means for indexing said chuck with reference to said cylindrical member to bring the desired lines of the tap teeth successively to the grinding position, and means for angularly limiting the rocking movement of said cylindrical member to be within a range that will ensure that only the teeth of the indexed land will undergo the grinding operation for this particular index position of said chuck, characterised by means for displacing, circumferentially of said cylindrical member, said means for angularly limiting the range of rocking movement whereby to vary the eccentric throw of said chuck relatively to the grinding wheel during said rocking movement, without changing the range of the latter, dependently upon the "relief" required.

2. An attachment, according to claim 1, of which the means for angularly limiting the range of the rocking movement of said cylindrical member comprises a gapped disc fast with said cylindrical member and adapted to coact with a stationary pin, and of which the means for displacing circumferentially of said cylindrical member, the said means for angularly limiting the range of rocking movement is provided by said stationary pin being carried by a part held to said body by means providing for relative angular adjustment.

SIDNEY H. ROLLASON.

REFERENCES CITED

The following references are of record in the file of this patent:

UNITED STATES PATENTS

| Number | Name | Date |
|---|---|---|
| 856,662 | Smith | June 11, 1907 |
| 916,452 | Klink et al. | Mar. 30, 1909 |
| 966,731 | Brinkmann | Aug. 9, 1910 |
| 1,698,807 | Willhauck | Jan. 15, 1929 |
| 1,981,174 | Hillie | Nov. 20, 1934 |
| 2,341,099 | Hellman | Feb. 8, 1944 |
| 2,391,317 | Klein | Dec. 18, 1945 |
| 2,413,436 | Dawson | Dec. 31, 1946 |
| 2,486,044 | Lusk | Oct. 25, 1949 |

FOREIGN PATENTS

| Number | Country | Date |
|---|---|---|
| 26,748 | Great Britain | Dec. 3, 1907 |
| 578,146 | Great Britain | June 17, 1946 |